United States Patent Office 3,583,879
Patented June 8, 1971

3,583,879
AMMONIACAL BINDER COMPOSITION FOR USE WITH BARIUM NITRATE ADHERENCE ADDITIVE
Raymond Apanavicius, Euclid, Ohio, assignor to General Electric Compnay
No Drawing. Filed Dec. 5, 1968, Ser. No. 781,633
Int. Cl. H01k 1/32
U.S. Cl. 117—33.5L                                    6 Claims

ABSTRACT OF THE DISCLOSURE

In making phosphor-coated fluorescent lamp envelopes or tubes, barium nitrate is used as an adherence additive and carboxymethylcellulose (CMC) is used as a temporary organic binder to hold the phosphor in place until lehring. In order to prevent bacterial growth in CMC, it is necessary to use a strongly basic suspension and such a suspension degrades with exposure to air. It has been found that stability in an ammoniacal CMC system can be obtained, if instead of pure CMC binder, a mixture of CMC and polyvinylmethylether/maleic anhydride (PVM/MA) copolymer is used.

CROSS-REFERENCES TO RELATED APPLICATIONS

Copending application Ser. No. 542,582 filed Apr. 4, 1966 by David H. Beaumont and Arnold I. Friedman, now Pat. No. 3,424,605, entitled "Lamp Phosphor Adherence" and similarly assigned, discloses the use of barium nitrate for improving the bonding of halophosphate phosphors to the glass envelope in a fluorescent lamp.

Copending application Ser. No. 558,093, filed June 16, 1966 by Livio L. Giudici, entitled "Lamp Phosphor Adherence" and similarly assigned, now Pat. No. 3,424,606, discloses the addition of ammonium nitrate to barium nitrate for improved bonding of halophosphate phosphors to the glass.

BACKGROUND OF THE INVENTION

The invention relates to an improved process and phosphor suspension for achieving better adherence of phosphors in fluorescent lamps without deleteriously affecting light output and maintenance.

In fluorescent lamp manufacture, phosphor coatings are normally provided by flushing the lamp with a suspension of phosphor particles, drying the suspension and then lehring the lamp envelope or tube. The suspension may have either an aqueous or an organic solvent and includes a temporary binder. The initial drying step is for the purpose of removing gross amounts of water or organic solvents. This leaves a phosphor film adhered to the inside of the glass tube by means of the temporary binder. Lehring removes any remaining water or organic solvents and burns out the temporary binder.

Due to the tendency of the phosphor coating to chip or flake off the inside of the tube and leave bare spots during lamp making or use, various additives for improving the adherence of the phosphor coating to the glass have been proposed. To be useful in a fluorescent lamp, an adherence additive must not react deleteriously with the lamp environment and must not absorb ultraviolet or visible radiation unproductively. In copending application Ser. No. 542,582, filed Apr. 14, 1966 by David H. Beaumont and Arnold I. Friedman, entitled, "Lamp Phosphor Adherence" and similarly assigned, the use of barium nitrate $Ba(NO_3)_2$ added to the aqueous suspension of phosphor to act as an adherence promoter upon lehring of the lamp is disclosed. In copending application Ser. No. 558,093, filed June 16, 1966 by Livio L. Giudici, entitled "Lamp Phosphor Adherence" and similarly assigned, the use of amomnium nitrate, $NH_4NO_3$ along with barium nitrate, $Ba(NO_3)_2$ to further promote adherence and facilitate lehring is disclosed.

The preferred temporary binder or organic adherence additive is carboxymethylcellulose (CMC). Because sodium is a deleterious impurity in fluorescent lamps, the commercial sodium salt of carboxymethylcellulose is not used, but instead acid carboxymethylcellulose is obtained as a starting material. Ammonium hydroxide can be added to a water suspension of acid carboxymethylcellulose at about 60° C. until a clear solution is produced. However the strongly basic suspensions produced with barium nitrate and ammoniated CMC tend to degrade over extended periods of time with exposure to air containing carbon dioxide as in continuous lamp making runs. Phosphor coatings are normally produced in fluorescent lamp tubes by either of two general methods, downflushing and upflushing. In downflushing, the phosphor suspension is flushed downwardly through the tube held vertical. In upflushing, the suspension is drawn or forced upward through the tube and then allowed to drain back out. In either process, considerable excess suspension is used and such excess is recycled. Downflushing normally involves aerating the suspension to a greater extent than does upflushing due to the way in which the suspension is sprayed into the empty tube from above. Loss of adherence promoting ability of the CMC phosphor suspension containing $$Ba(NO_3)_2$$

is particularly rapid in downflush coating. The degradation seems to take place by conversion of $Ba(NO_3)_2$ to $BaCO_3$ through absorption of carbon dioxide from the atmosphere. The $BaCO_3$ does not lead to the adherence improvements obtained with $Ba(NO_3)_2$.

It has been attempted to circumvent the degradation of ammoniated CMC by recourse to a neutral CMC binder system. The CMC suspension can be changed from strongly basic to neutral or slightly acid by boiling out excess ammonia at a temperature such as about 95–100° C. for a sufficient time to bring the pH to the desired level of about 6 to 7. By so doing, the effectiveness of neutral CMC is preserved and conversion to carbonate does not take place. However other difficulties appear having to do principally with deterioration of the neutral suspension by bacterial attack after periods of storage. This seems to be caused by common airborne or soil-inhabiting bacteria which digest the cellulosics present in the carboxymethylcellulose of the suspension. After some time, strong odors develop which make the material very unpleasant to work with. In some cases bacterial growth has decreased the viscosity of the neutral suspension to such an extent that it is not usable after a continuous coating run of several hours. While the addition of bactericides will reduce the rate of bacterial attack in neutral CMC, deterioration still takes place.

SUMMARY OF THE INVENTION

The object of the invention is to provide a new and improved process and phosphor suspension for coating fluorescent lamps utilizing aqueous suspensions with $Ba(NO_3)_2$ adherence additive not subject to degradation upon exposure to air or deterioration through bacterial action.

In accordance with the invention, I have found that stability of barium nitrate toward carbon dioxide in an ammoniacal binder system can be obtained if, instead of pure carboxymethylcellulose (CMC) binder, a mixture of CMC and polyvinylmethylether/maleic anhydride copolymer (PVM/MA) is used. In this combination, the PVM/MA prevents barium carbonate from forming and precipitating even at the low concentrations encountered in binder solutions. The use of ammoniacal CMC in the pH range from 9 to 11 effectively stops bacterial action and eliminates deterioration of the suspension from this cause.

DETAILED DESCRIPTION

The ability of PVM/MA, either alone or mixed with CMC, to prevent the precipitation of barium carbonate from an aqueous solution of barium nitrate may be demonstrated as follows. Into individual flasks, introduce barium nitrate solution at a concentration typical of a phosphor suspension, for instance 0.15% by weight. Into different flasks, add solutions of ammonia, of ammoniacal CMC, of ammoniacal PVM/MA, and of ammoniacal PVM/MA+CMC. One series of tests was run at pH 9 to 9.5, and the other at pH 11. Equivalent amounts of ammonium carbonate solution was then added with stirring to each flask to precipitate all barium as barium carbonate. A rather heavy precipitate formed immediately in the flasks containing ammonia and ammoniacal CMC. No precipitate at all formed in the flasks containing PVM/MA and PVM/MA mixed with CMC, even after several days of standing.

To demonstrate the stability of ammoniacal phosphor suspensions containing barium nitrate and mixed CMC-PVM/MA polymers, I have bubbled air containing 1.7% by volume added $CO_2$ through the suspension for up to 8 hours. During this period of time, the suspension was maintained on the ammonical side by periodically adding free ammonia to compensate for loss of ammonia by air bubbling. After this severe treatment, the coating appearance was perfect, entirely free of pinholes, having improved whiteness and brightness after lehring, and the expected adherence. Also a slight lumen increase was realized amounting to about 16 lumens with respect to a control level of 3200 lumens.

A still more drastic experiment was carried out by bubbling pure carbon dioxide gas directly into a sample of suspension. After 30 minutes of such bubbling, the ammoniacal suspension remained stable without precipitation and retained all the adherence advantages.

By way of example of the the use of the invention in fluorescent lamp manufacture, alkaline earth halophosphate phosphors for use in lamps, such as calcium halophosphate phosphor activated with antimony and manganese, may be prepared by methods known in the prior art. After the phosphors are produced by firing, they are milled to disperse agglomerates and then washed to remove deleterious impurities. Milling can be done in aqueous suspension using a suspending medium such as polyvinylmethacrylate/maleic anhydride, and washing can be done with ammoniated ethylenediamine tetraacetic acid (EDTA) according to U.S. Pat. 3,047,512—Martyny. Alternatively, washing may be done using sulphamic acid $NH_2SO_3H$, as taught in U.S. Pat. 3,384,598 to Friedman and Beaumont. The phosphor particles may then be classified according to size. Finally they are rinsed in hot water and centrifuged to reduce the water content, for instance to about 20%.

To prepare the suspension, a mix of ammoniacal carboxymethylcellulose and polyvinylmethylether/maleic anhydride copolymer in approximately a 2% solution in water and having a pH from 8 to 13 is added to the cleaned phosphor to a level from 0.3 to 0.9% mix by weight based on the dry phosphor content. Coarse particle phosphors require a higher percentage of binder mix than fine. Barium nitrate is then added, preferably in the form of a 5% solution in water, to the desired level. The preferred $Ba(NO_3)_2$ content is in the range of 0.05–0.3% by weight compared with the total amount of phosphors present on a dry basis. Ammonium nitrate may also be added, preferably as a 15 to 25% water solution to the phosphor suspension. If used, the amount of $NH_4NO_3$ should be within the limits of 0.1 to 2.5%, preferably 0.25 to 1.0% based on the weight of the dry phosphor present.

The range of suitable concentrations of CMC and PVM/MA is determined by a number of factors in addition to mere feasibility. Among the latter are coating appearance, that is absence of coating flaws, drying time, cost, etc. As little as 10% PVM/MA with 90% CMC has been found effective. When the proportion of PVM/MA becomes too high, coating difficulties including required drying time increase; this sets an upper limit of about 75% for the proportion of PVM/MA. The preferred proportions of CMC and PVM/MA are 50% of each. The preferred range of absolute concentrations of binder mix in terms of dry phosphor weight is from 0.4 to 0.6%, with 0.55% preferred for classified calcium halophosphate phosphors. The preferred pH is from 9 to 11 which may require adding more ammonia from time to time to replace any lost to the atmosphere during the time a batch of suspension is in use for coating tubes.

The above mixture is thoroughly homogenized by a high-speed mixer to assure absence of lumps. A glass tube may then be coated by flowing the suspension over the tube surface, for instance by downflushing as previously described. After drying, the coated tubes are lehred at a temperature and for a time sufficient to decompose the binder and effectuate bonding of the phosphor particles to the glass. A temperature of 625° C. to 650° C. for a few minutes is sufficient. The phosphor-coated tubes are then ready to be made into fluorescent lamps.

Comparative snap testing of lamps using only CMC for the temporary binder, with lamps made in accordance with the present invention using a mixture of CMC and PVM/MA for the temporary binder are set forth in the table below. In both cases, barium nitrate along with ammonium nitrate were present as permanent adherence additives. Snap testing involves resiliently impacting the lamp under controlled conditions and then measuring the diameter of the area of phosphor which has been knocked off, such area being referred to a "coating off." The measurement given is the major diameter of the oval bare spot which occurs about the point of impact.

COATING OFF BY SNAP TEST

|  | Fresh suspension, mm. | After 8 hrs: cycling, mm. |
| --- | --- | --- |
| Control—CMC only | 30 | 70 |
| 50/50 CMC and PVM/MA | 25 | 25 |

The above snap testing results show the superiority of the CMC and PVM/MA combination with which coating off is no greater after 8 hours cycling. The CMC and PVM/MA combination is unique among presently known water-soluble polymers in coatability, adherence and resistance to degradation under cycling conditions.

What I claim as new and desire to secure by Letters Patent of the United States is:

1. A method of coating a fluorescent lamp tube comprising making an aqueous suspension of phosphor particles containing, by weight based on the amount of dry phosphor, about 0.05–0.3% $Ba(NO_3)_2$ and from 0.3 to 0.9% of a temporary binder mix of ammoniacal carboxymethylcellulose (CMC) and 10 to 75% polyvinylmethylether/maleic anhydride copolymer (PVM/MA), said aqueous suspension having a basic pH from 8 to 13, flowing said suspension over the tube surface, drying the coated tube, and then lehring the tube at a temperature and for a time sufficient to decompose the temporary binder and effectuate bonding of the phosphor particle to the glass.

2. The method of claim 1 wherein the phosphor is alkaline earth halophosphate and the pH of the suspension is from 9 to 11.

3. The method of claim 1 wherein the phosphor is calcium halophosphate, the pH of the suspension is from 9 to 11 and the concentration of binder mix is from 0.4 to 0.6% by weight based on the amount of dry phosphor.

4. The method of claim 3 wherein the proportion of CMC to PVM/MA is 50% of each.

5. The method of claim 1 wherein the phosphor is calcium halophosphate, the pH of the suspension is from 9 to 11, the proportion of CMC and PVM/MA in the binder mix is about 50% of each, and the concentration of binder mix is about 0.55% by weight based on the amount of dry phosphor.

6. The method of claim 5 where the suspension contains in addition from 0.1 to 2.5% $NH_4NO_3$ by weight based on the amount of dry phosphor.

References Cited

UNITED STATES PATENTS

| 3,303,042 | 2/1967 | Reed et al. | 117—33.5 |
| 3,424,605 | 1/1969 | Beaumont et al. | 117—33.5 |

ALFRED L. LEAVITT, Primary Examiner

W. F. CYRON, Assistant Examiner

U.S. Cl. X.R.

252—301.3R